US008891108B2

(12) United States Patent
Tomaru

(10) Patent No.: US 8,891,108 B2
(45) Date of Patent: Nov. 18, 2014

(54) PRINTING SYSTEM ACCORDING TO DETECTION OF THE PRINT PREVIEW COMMAND

(75) Inventor: Masashi Tomaru, Tokyo (JP)

(73) Assignee: Oki Data Corporation, Tokyo (JP)

( * ) Notice: Subject to any disclaimer, the term of this patent is extended or adjusted under 35 U.S.C. 154(b) by 312 days.

(21) Appl. No.: 12/591,029

(22) Filed: Nov. 5, 2009

(65) Prior Publication Data

US 2010/0123925 A1 May 20, 2010

(30) Foreign Application Priority Data

Nov. 19, 2008 (JP) .................. 2008-295049

(51) Int. Cl.
*G06F 3/12* (2006.01)
*G06K 15/02* (2006.01)

(52) U.S. Cl.
CPC ............ *G06F 3/1208* (2013.01); *G06F 3/1256* (2013.01)
USPC ........... 358/1.15; 358/1.13; 358/1.9; 715/274

(58) Field of Classification Search
USPC ............. 358/1.6, 1.12, 1.13, 1.14, 1.15, 1.18; 705/400, 401, 408, 410
See application file for complete search history.

(56) References Cited

U.S. PATENT DOCUMENTS

| 2002/0085311 A1* | 7/2002 | Wakahara | 360/131 |
| 2006/0114502 A1* | 6/2006 | Kang et al. | 358/1.15 |
| 2007/0024880 A1* | 2/2007 | Sato et al. | 358/1.9 |
| 2007/0182984 A1* | 8/2007 | Ragnet et al. | 358/1.15 |

FOREIGN PATENT DOCUMENTS

| JP | A-H11-143667 | 5/1999 |
| JP | 2002-216043 A | 8/2002 |
| JP | 2005-055949 A | 3/2005 |
| JP | A-2006-340220 | 12/2006 |
| JP | 2007136815 A * | 6/2007 |
| JP | A-2007-136815 | 6/2007 |
| JP | A-2007-249301 | 9/2007 |

* cited by examiner

*Primary Examiner* — Scott A Rogers
*Assistant Examiner* — Richa Mishra
(74) *Attorney, Agent, or Firm* — Muncy, Geissler, Olds & Lowe, P.C.

(57) ABSTRACT

A print device according to the present disclosure having a print part for a print operation an image of a print data on a medium includes a memory part configured to memorize a unit price of the medium, and an analysis part configured to analyze whether or not a medium cost determined from the unit price of the medium memorized in the memory part exceeds a predetermined cost, and to create preview data of a print result when the medium cost determined from the unit price of the medium exceeds the predetermined cost.

4 Claims, 17 Drawing Sheets

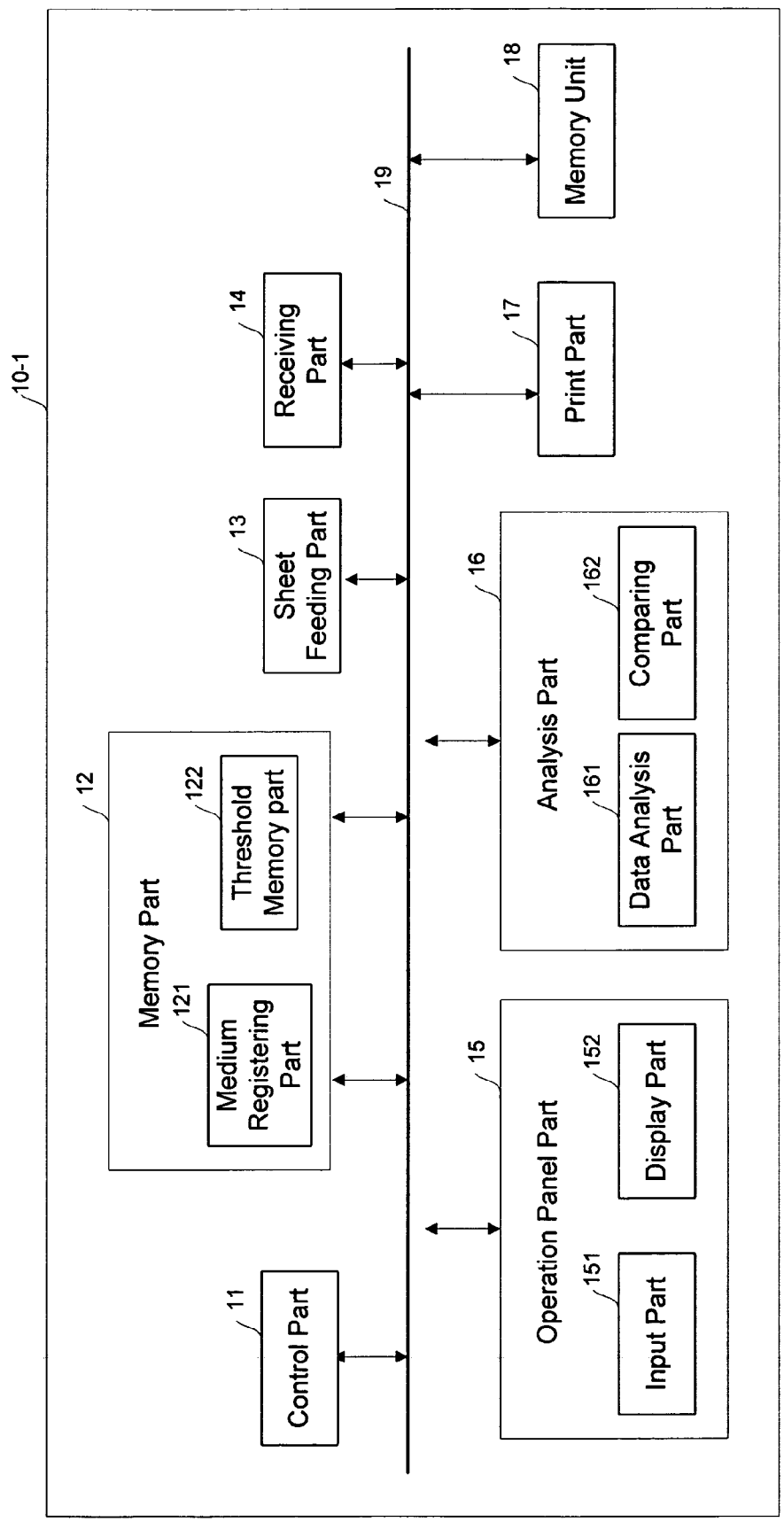

| Threshold Memory Part — 122 |
|---|
| 30 Yen — 220 |

Fig. 2B

| Medium Registering Part — 121 | |
|---|---|
| Medium Type — 200 | Unit Price (Yen) — 210 |
| Regular Paper — 201 | 1 |
| High-Quality Paper — 202 | 2 |
| Matt Paper — 203 | 6 |
| Gloss Paper — 204 | 50 |
| Gloss Photo Paper — 205 | 60 |

Fig. 2A

| No. Tray | Type of Medium |
|---|---|
| 1st | Regular Paper |
| 2nd | High-Quality Paper |
| 3rd | Matt Paper |
| 4th | Gloss Paper |
| 5th | Gloss Photo Paper |

Fig. 3

| 1101 | Unit Price of Gloss Paper | 50 Yen |
| --- | --- | --- |
| 1102 | Number of Pages | 3 |
| 1103 | Number of Copies | 1 |

Medium Cost = (Number of Pages) × (Unit Price of Gloss Paper) × (Number of Copies)

| 1104 | Medium Cost | 150 Yen |
| --- | --- | --- |

PRINTING SYSTEM ACCORDING TO DETECTION OF THE PRINT PREVIEW COMMAND

CROSS REFERENCE

The present application is related to, claims priority from and incorporates by reference Japanese patent application number 2008-295049, filed on Nov. 19, 2008.

TECHNOLOGY FIELD

The present invention relates to a print device, particularly the print device and a print system that can display a preview of a print result when necessary. Also, the present invention relates to a method for a print operation of print data.

BACKGROUND

Recent print devices can handle a variety of printing media (print papers) in order to satisfy users. Particularly, there are expensive printing media used only for printing art work data such as printing media specialized in art. If a large volume of print jobs are executed erroneously or a print job fails when using expensive printing media, financial loss will be large. In order to prevent the above problems, a print device that has been developed is configured to send an alarm message to the user when expensive medium is selected for use, and to prevent erroneous use of the expensive media. See Japanese laid open patent application publication number 2007-136815 (Reference 1).

However, the method disclosed in Reference 1 only displays an alarm message when the expensive medium is going to be used. Therefore, once printing on the medium is approved, printing is executed even when the printing content is inappropriate. This can result in unnecessary print costs.

The disclosed embodiments have overcome the above problems, and are directed to a print device and its printing control program that issues an alarm when a medium cost is higher than a predetermined value and confirms a content of print job. In this way, the disclosed embodiments can cut down on unnecessary print costs.

SUMMARY

A purpose of the disclosed device, system and method is to display a preview before executing a print operation when the print cost is expected high. Another purpose is to confirm the contents of the print operation before executing the print operation only when the printing will be considered costly according to certain criteria.

If a preview operation was performed for every print operation, the operation time to complete the print operation could become very long. This is because the preview process takes additional time. And such a process may be considered unnecessary for relatively low cost print operations. However, when using an expensive medium (e.g., paper with a comparatively high cost per page), or when the print operation itself will be costly (e.g., a large number of total pages to print), the user may wish an opportunity to avoid an erroneous print operation. As a result, in these cases it may be desirable to check the print content using a preview image prior to printing. In this way a printing error, as its associated costs, can be avoided.

Thus, this provides an advantage as compared to systems that simply provide an alarm when an expensive medium is used. The disclosed device, system and method allow a preview before actual printing on the expensive medium, allowing for the avoidance of unnecessary printing in situations where printing on the expensive medium is approved. If an error occurs that would cause the printed documents to have to be discarded In order to achieve the aforementioned purpose, a print device according to the present disclosure having a print part for a print operation an image of a print data on a medium includes a memory part configured to memorize a unit price of the medium, and an analysis part configured to analyze whether or not a medium cost determined from the unit price of the medium memorized in the memory part exceeds a predetermined cost, and to create preview data of a print result when the medium cost determined from the unit price of the medium exceeds the predetermined cost.

Herein, the medium cost is directed either to a unit price of the medium or to a calculated total cost of a print operation considering numbers of pages and copies. Following created by the analysis part, the preview data is displayed on any type of a display part. For example, the display part may be equipped with the print device, or with a computer connecting the print device via a network Moreover, in order to achieve the aforementioned purpose, a print device according to the present disclosure includes a print part configured to print an image of print data on a medium, a medium registering part configured to register one or more media that can be used for a print operation, and an analysis part configured to analyze the print data, to verify whether or not a requested medium is registered, and to create preview data when the medium is registered.

Moreover, in order to achieve the aforementioned purpose, a print device according to the present disclosure includes a print part configured to print an image of print data on a medium, an analysis part configured to analyze print data and to create preview data when a preview display command is detected based on the analysis, and a display part configured to display the preview data.

Moreover, in order to achieve the aforementioned purpose, a print system according to the present disclosure includes a computer, a network, and a print device. The computer comprises a sending/receiving part configured to transmit at least print data to the print device through the network, and the print device comprises a print part configured to print an image of print data on a medium. One of the computer or the print device further includes a medium registering part configured to register one or more media that can be used, an analysis part configured to analyze the print data, to verity whether or not the medium requested is registered, and to create preview data when the medium is registered, and a display part configured to display the preview data created at the analysis part.

Moreover, in order to achieve the aforementioned purpose, according to the present disclosure, a method of controlling a print operation of print data includes the following: receiving the print data; determining a medium type for the print operation of the print data; determining a unit price of the medium type; determining a medium cost based on the unit price; determining a threshold value; creating preview data of the print data if the unit price exceeds the threshold value; and displaying the preview data if the print data is created.

The disclosed embodiments can provide a print device, a print system, and a method for the print operation that can alarm when a medium cost is higher than the predetermined cost and the user can confirm a printing content prior to the print operation. Accordingly, the disclosed embodiments can provide the print device that can prevent erroneous print operations (or erroneous print cost) with certain work effectively because a preview of the print result is displayed only in predetermined cases: for example, i) when the medium cost is expensive, ii) when printing a large volume of papers, iii) when using a predetermined special medium, or iv) when a designated condition is set, or the like.

BRIEF DESCRIPTION OF DRAWINGS

FIG. 1 is a block diagram illustrating a structure of a printer as a print device in a first embodiment.

FIG. 2A is a table illustrating a data example of a medium registering part in the first embodiment that is shown in FIG. 1. FIG. 2B is a table illustrating a data example of a threshold memory part in the first embodiment that is shown in FIG. 1.

FIG. 3 is a pattern diagram illustrating a sheet feeding part in the first embodiment.

FIG. 11 is an explanatory diagram illustrating an operation of determining a medium cost in the fourth embodiment.

DETAILED DESCRIPTIONS

First Embodiment

Figure 4:
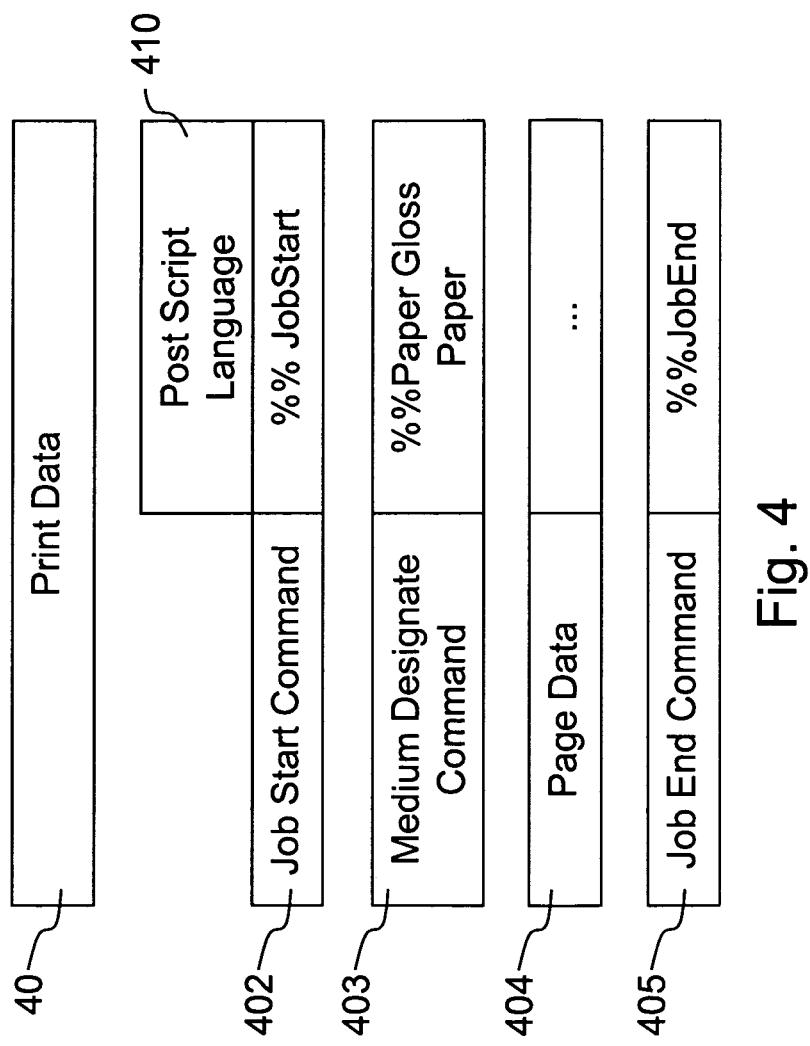
FIG. 4 is a pattern diagram illustrating print data in the first embodiment.

The print device of the present invention is explained with reference to FIGS. 1 and 6.

FIG. 1 is a block diagram showing a structure of a printer 10-1 as the most preferred print device. The printer 10-1 has a structure illustrated in FIG. 1 in view of function. In other words, a control part 11, a memory part 12, a sheet feeding part 13, a receiving part 14, an operation panel part 15, an analysis part 16, a print part 17 and a memory unit 18 are connected through a bus 19 so as to mutually communicate with each other.

At this point, the control part 11 uniformly manages operations and conditions of the other parts and units of the printer 10-1. The memory part 12 stores and saves information, and includes a medium registering part 121 for memorizing medium types and unit prices and a threshold memory part 122 for memorizing a threshold value (predetermined value) for comparing the unit price of medium.

The sheet feeding part 13 is a mechanical part for feeding the medium to be printed. The receiving part 14 receives externally input print data. The operation panel part 15 is an operation panel, and includes an input part 151, which is equivalent to a touch panel or a keyboard to input instructions and information corresponding to operations of the user, and a display part 152, which is equivalent to a display device such as a liquid crystal display. The analysis part 16 includes a data analysis part 161 for analyzing the print data received at the receiving part 14, and a comparing part 162 for comparing the unit price and the threshold value that are memorized at the memory part 12. The print data analyzed at the data analysis part 161 is printed at the print part 17. Thereafter, data for printing is temporally saved in the memory unit 18.

FIG. 2A illustrates a data example of the medium registering part 121 of the memory part 12, and FIG. 2B illustrates a data example of the threshold memory part 122 of the memory part 12. As shown in FIG. 2A, a medium type 200 and a unit price 210 that is equivalent to the price per medium are memorized in the medium registering part 121. In the present embodiment, five types of papers that have a different unit price 210 are registered: a regular paper 201, a high-quality paper 202, a matte paper 203, a gloss paper 204, and a gloss photo paper 205. As shown in FIG. 2B, a threshold value 220 (e.g., 30 yen) is memorized in the threshold memory part 122.

FIG. 3 illustrates a pattern diagram of the sheet feeding part 13. The sheet feeding part 13 has a plurality of sheet feeding trays. In the present embodiment, the sheet feeding part 13 is formed of five trays, including a first tray 301, a second tray 302, a third tray 303, a fourth tray 304 and a fifth tray 305. Each tray contains one type of the media. FIG. 3 shows that the regular paper 201 is stored in the first tray 301, the high-quality paper 202 is stored in the second tray 302, the matte paper 203 is stored in the third tray 303, the gloss paper 204 is stored in the fourth tray 304, and the gloss photo paper 205 is stored in the fifth tray 305.

FIG. 4 illustrates a pattern diagram of print data 40. In the present embodiment, the print data 40 is described with Post-Script™ language 410 of ADOBE™, and includes a job start command 402, a medium designate command 403, page data 404 that includes an image to be printed, and a job end command 405 which indicates a finishing end (or terminal) of the print data 40.

Figure 5:
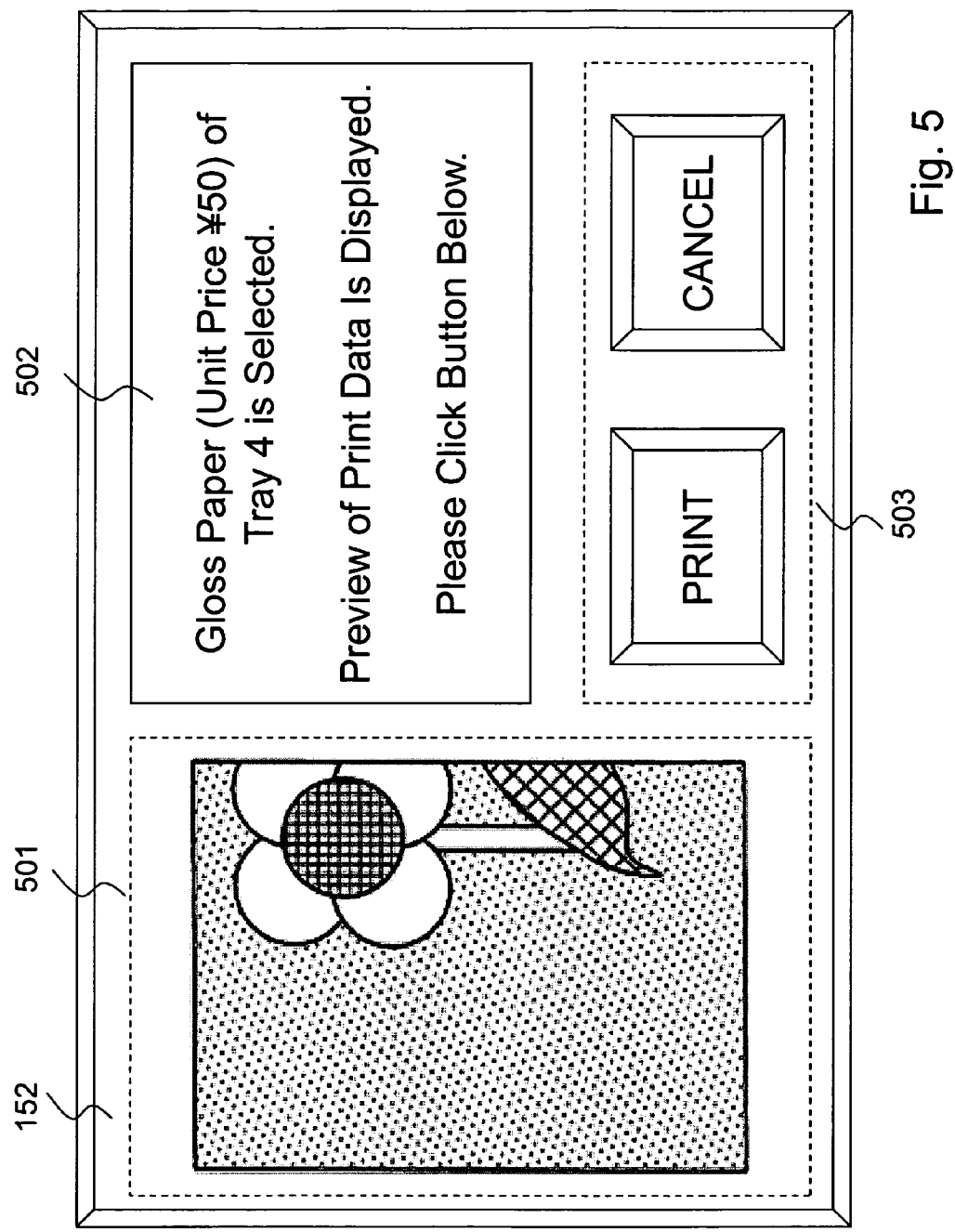
FIG. 5 is an example of displaying a preview of the print result in the first embodiment.

In the present embodiment, a preview function is used as a means to confirm whether or not the print result (or print data) is what the user desired. FIG. 5 shows an example of the preview of the print result that is displayed on the display part 152. The display part 152 includes a preview area 501 for displaying a preview of the print result, a message area 502 for displaying a message, and a button area 503 for displaying buttons for the user to operate an order. A display part for the preview is configured with the operation panel part 15 which includes the display part 152, the analysis part 16 and the control part 11.

The preview area 501 of FIG. 5 illustrates a print result in which an image is partially out of the printing medium (sheet), and that the image is not going to be correctly printed. The message area 502 displays a message reporting that the gloss paper 204 of the fourth tray 304 being selected and the unit price 210 is 50 yen, and requests the user to choose the print operation. Two buttons of "PRINT" and "CANCEL" are displayed on the button area 503.

The printer 10-1 of the present embodiment includes a sheet feeding parts 13 that is configured with a plurality of trays. Each of the first tray 301, the second tray 302, the third tray 303, the fourth tray 304 and the fifth tray 305 in FIG. 3 contains the medium illustrated in the medium type 200 in FIG. 2. When the print data 40 in FIG. 4 is received at the receiving part 14, the data analysis part 161 analyzes the print data 40, and determines the medium to be printed. Subsequently, the data analysis part 161 determines and obtains the unit price 210 of the medium to be printed from the medium registering part 121, and compares the unit price 210 with a threshold value 220 that is stored in the threshold memory part 122. Then, the preview of the print result is displayed on the display part 152 when the unit price 210 of the medium is larger than the threshold value 220.

Figure 6:
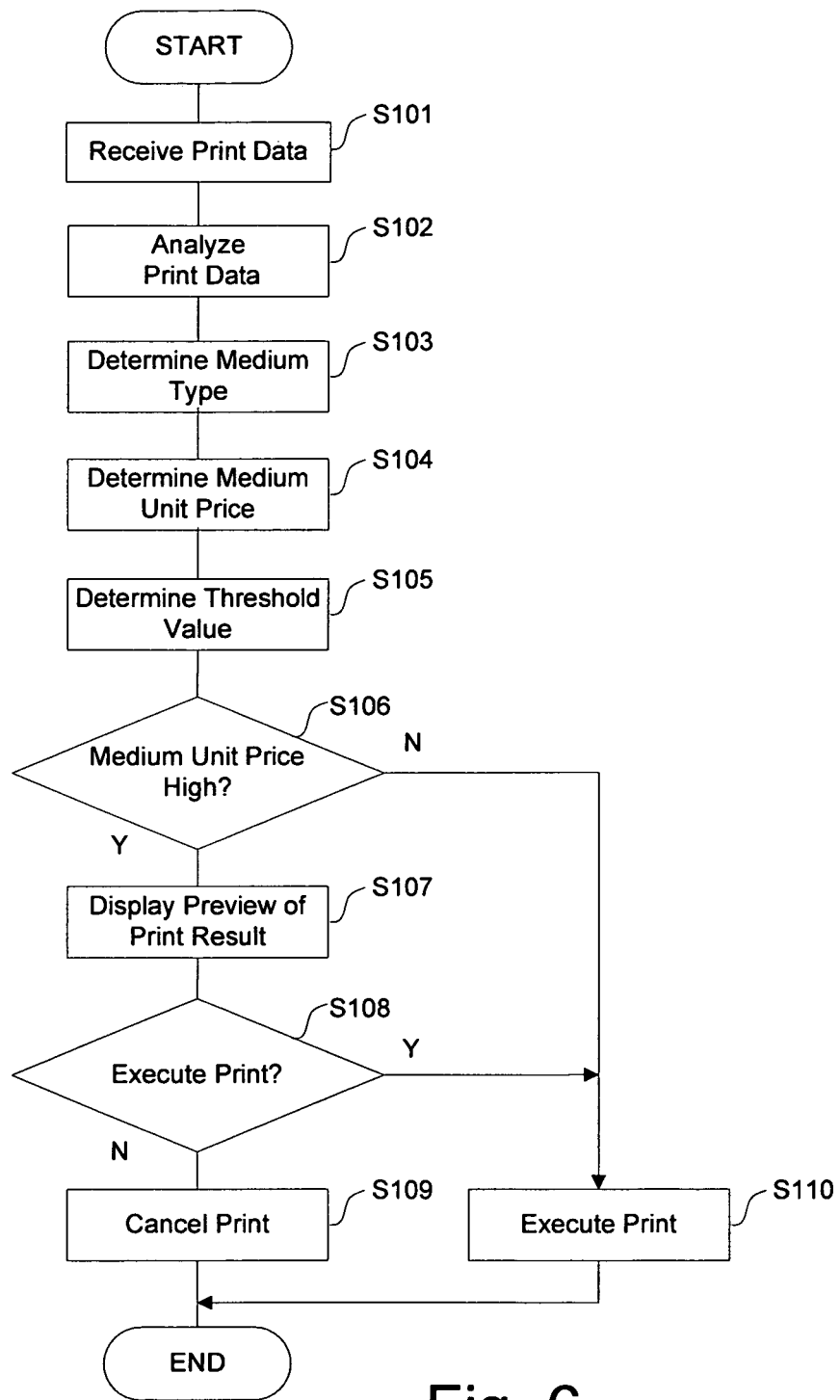
FIG. 6 is a flow diagram illustrating an operation of the printer in the first embodiment.

FIG. 6 is the flow diagram explaining the operation of the printer 10-1 in the first embodiment, and is a control flow diagram to display a preview based on the unit price 210 of the medium and the threshold value 220. Hereafter, the operation of the printer 10-1 is explained with reference to FIG. 6.

Initially, the print data 40 is received at the receiving part 14 (S101). Next, the print data 40 is analyzed at the data analysis part 161 (S102). The medium type for printing is obtained (i.e., determined) from the print data 40 based on the result of analysis at the data analysis part 161 (S103). More specifically, the medium type is determined in correspondence to the medium designate command 403 (%% Paper Gloss Paper as shown in FIG. 4) that is a part of the print data. Next, the unit price 210 of the medium for printing is determined from the medium registering part 121 (S104). Then, the threshold value 220 is determined from the threshold memory part 122 (S105).

Next, the comparing part 162 compares whether or not the unit price 210 is higher than the threshold value 220 (S106). When the unit price 210 is higher (YES) than the threshold value 220, processing proceeds to S107, and when it is lower (NO), processing proceeds to S110. At S107, the analysis part 16 creates preview data of the print result and displays the preview on the display part 152.

Next, the user judges whether or not to print based on the preview (S108). In short, processing judges whether or not the "PRINT" button is pressed (or clicked). When processing is executed, i.e., the "PRINT" button is pressed (YES), processing proceeds to S110, i.e., the printing is executed and processing completes. When processing is not executed, i.e., the "CANCEL" button is pressed (NO), processing proceeds to S109, i.e., printing is canceled and processing completes.

Moreover, although the present embodiment describes two different steps whether to execute printing or to cancel printing after the preview is confirmed. The present invention is not limited to the description above. The print data 40 can be modified and reprinted so that the user obtains it's desired print result, or can be printed on another medium and reprinted. Also, the print setting such as resolution and number of copies can be adjusted while the user views the preview, then the print data is reprinted.

Second Embodiment

Figure 7A:
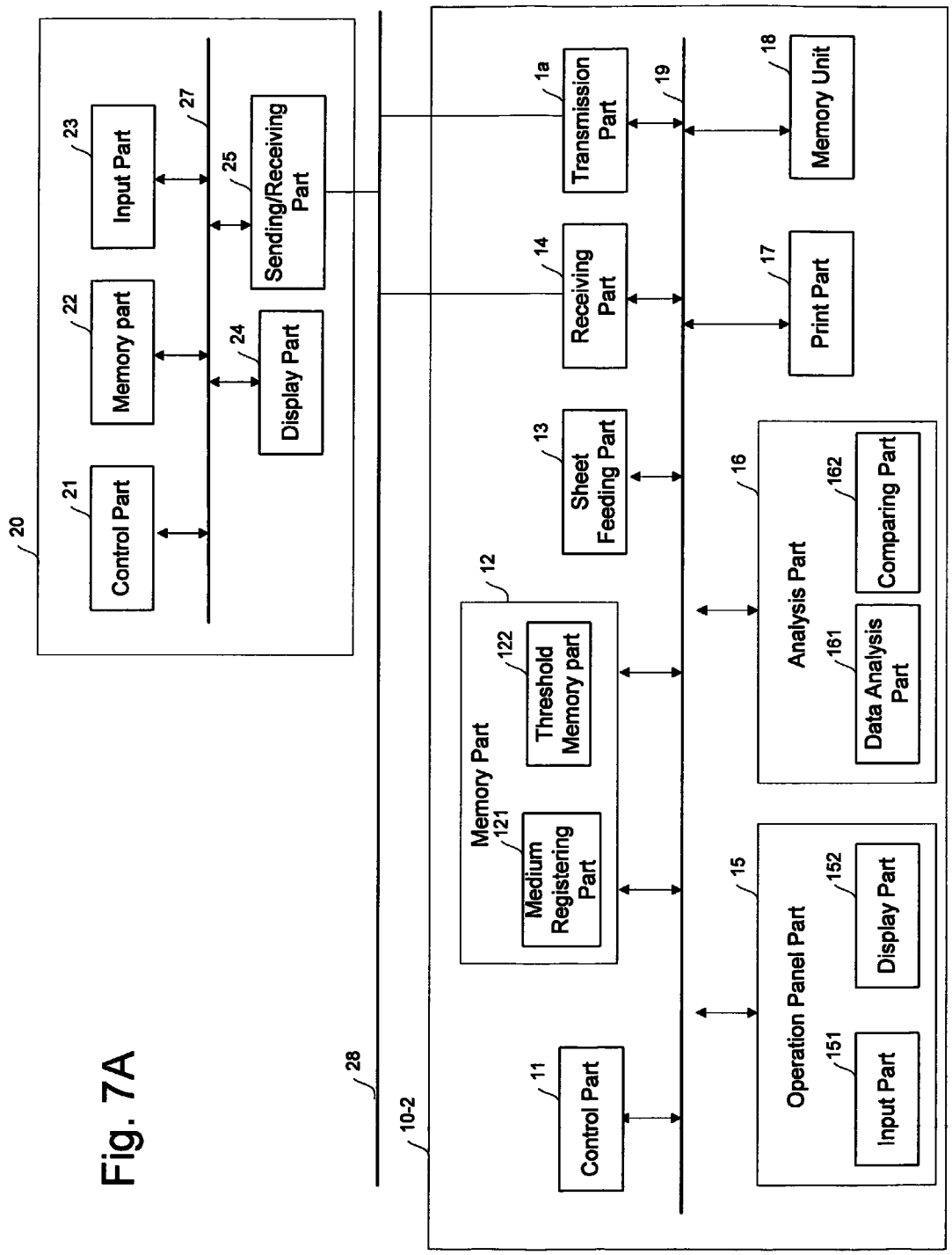
FIG. 7A is a block diagram illustrating a print system in a second embodiment.
Figure 8:
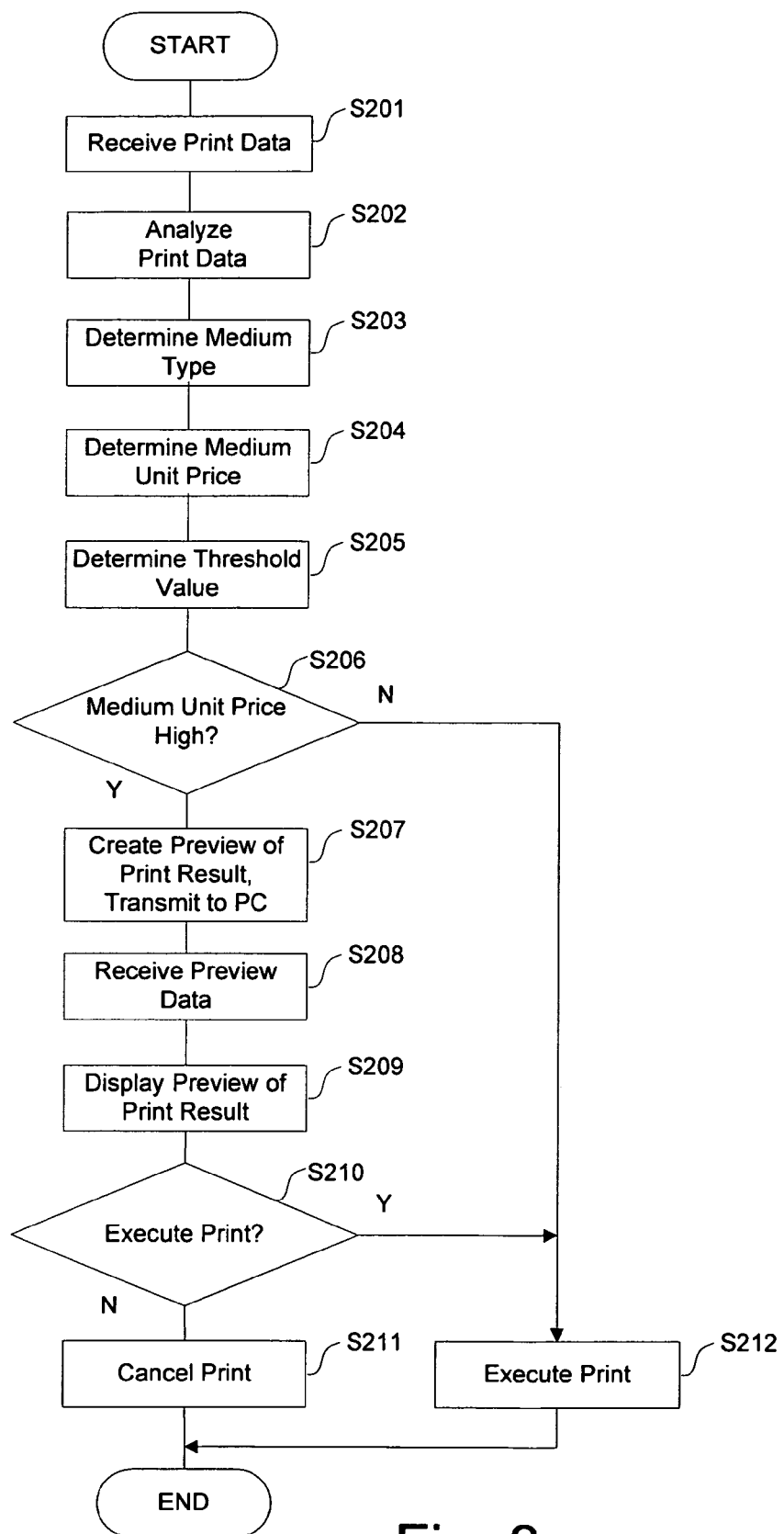
FIG. 8 is a flow diagram illustrating an operation of a printer in the second embodiment.

The printing system of a second embodiment of the present invention is explained referring to FIGS. 7A and 8.

FIG. 7A is a block diagram that illustrates a printing system according to the second embodiment. For example, the second embodiment has a structure that includes a notebook-size personal computer (hereafter PC or a host device) 20 and a network bus 28 that are added to the first embodiment. In addition, a printer 10-2 and the PC 20 are connected through the network bus 28. The PC 20 includes a control part 21, a memory part 22, an input part 23, a display part 24 and a sending/receiving part 25. The control part 21 uniformly manages operation and condition of each part of the entire PC 20. The memory part 22 stores many kinds of information. The input part 23 is formed from a keyboard, a mouse or the like, and inputs information to the PC 20. The display part 24 displays the input information and the received data on a monitor or the like. The sending/receiving part 25 sends and receives data to/from the external network through the network bus 28.

The printer 10-2 is similar to the printer 10-1 of the first embodiment, except that it also includes a transmission part 1a. In other words, in the second embodiment, the preview data of the print result is transmitted to the PC 20 from the printer 10-2 when the unit price 210 of the medium to be used is high, and the control part 21 of the PC 20 displays the preview of the print result on the display part 24. In comparison, in the first embodiment, the preview of the print result is displayed on the display part 152 of the printer 10-1 when the unit price 210 of the medium to be used is high.

Accordingly, the block diagram illustrated in FIG. 7A shows a structure that has the transmission part 1a that transmits the preview data of the print result to the PC 20 through the network bus 28. In FIG. 7A, same numerals of FIG. 1 are applied to the same structure elements, and the explanations are omitted as the other structures are the same as FIG. 1.

FIG. 8 is a flow diagram illustrates operation of the printer 10-2 and the PC 20 in the second embodiment. In the second embodiment, the following steps are added compared to the first embodiment: comparing the unit price 210 of the medium and the threshold value 220, creating preview data of the print result at the analysis part 16 of the printer 10-2 when the unit price 210 of the medium is higher than the threshold value 220, and transmitting the preview data to the PC20 (S207); receiving the preview data of the print result at the sending/receiving part 25 of the PC 20 (S208); and displaying the preview based on the preview data that is received at the sending/receiving part 25 of the PC 20 on the display part 24 of the PC 20 (S209). Other operations are similar to those illustrated in FIG. 6. The above operation by the printer 10-2 is executed by a control program for the printer 10-2.

The operation of this system is explained referring to FIG. 8. Initially, the receiving part 14 receives the print data 40 (S201). Subsequently, the data analysis part 161 analyzes the print data 40 (S202). The medium type that is received from the print data 40 is determined based on the analysis result of the data analysis part 161 (S203). Subsequently, the unit price 210 of the medium to be printed is obtained (i.e., determined) from the medium registering part 121 (S204). Subsequently, the threshold value 220 is determined from the threshold memory part 122 (S205).

Next, the comparing part 162 compares whether or not the unit price 210 of the medium is higher than the threshold value 220 (S206). When the unit price 210 is higher than the threshold value 220 (YES), processing proceeds to S207, and when the unit price 210 is lower than the threshold value 220 (NO), processing proceeds to S212.

The analysis part 16 then creates the preview data of the print result, and the preview data is transmitted to the PC 20 from the transmission part 1a (S207). The PC 20 receives the transmission data at the sending/receiving part 25 (208), and the display part 24 displays the preview of the print result (i.e., it performs a preview display function) (S209).

Consequently, the user determines whether or not to print based on the preview display (S210). When processing is executed (YES), processing proceeds to S212, and when processing is not executed (NO), processing proceeds to S211. Then, printing is canceled when processing proceeds to S211 and ends processing. Moreover, when processing proceeds to S212, the printing is executed and ends processing.

According to the second embodiment, when an expensive medium is selected, the preview data of the print result is transmitted to the PC 20 through the network bus 28, and is displayed on the display part 24 of the PC 20 so that the user confirm the print result prior to the actual printing operation. Accordingly, it is prevented from undesired prints consuming the expensive medium and print cost corresponding to the prints when the print result does not match the user's desire. In addition, even when the printer 10-2 does not have a preview displaying function, the print result can be displayed on another device so that the user confirms the print result.

Third Embodiment

In the second embodiment above, the printer 10-2 is formed from the medium registering part 121, the threshold memory part 122, the data analysis part 161 and the comparing part 162. These functions can be executed by the PC 20, which is connected to the printer 10-2 through the network bus 28 or the communication line.

Figure 7B:
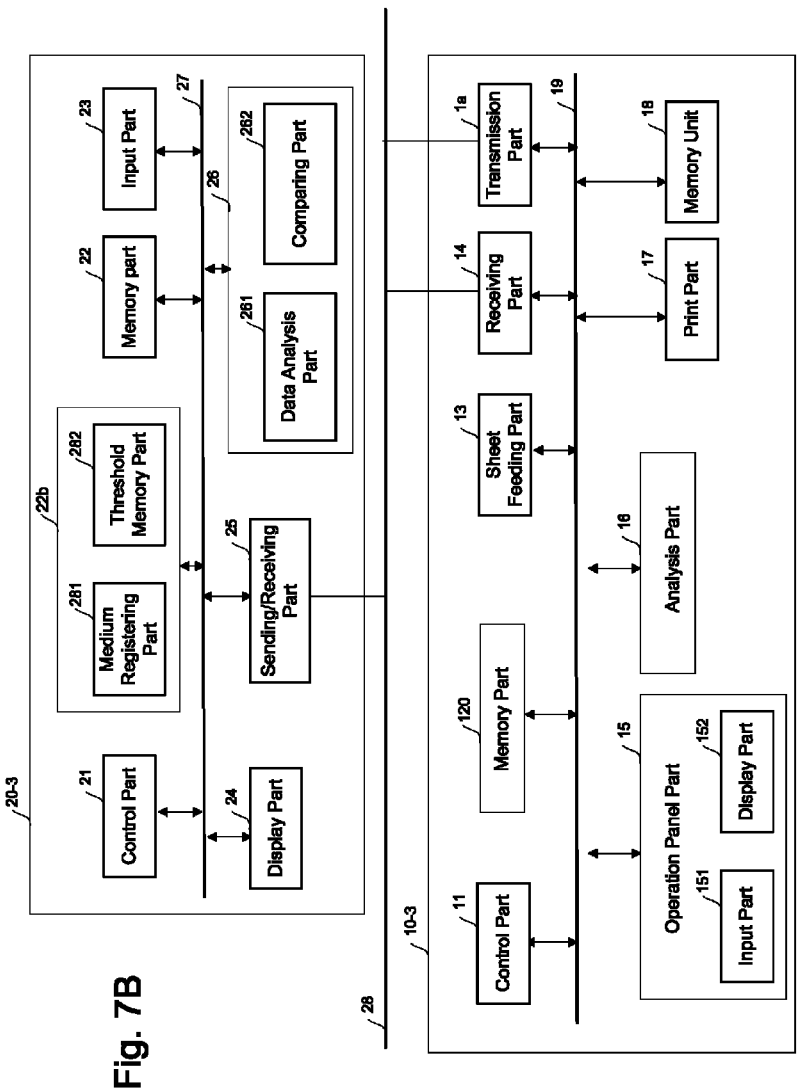
FIG. 7B is a block diagram illustrating a print system in a third embodiment.

In the third embodiment, the printing system is explained referring to FIG. 7B. FIG. 7B is a block diagram that illustrates a printing system according to the third embodiment. The third embodiment has a structure similar to the second embodiment In other words, in the third embodiment, the function of the medium registering part 121 for having memorized the medium type, the unit price or the like in advance that is described in the second embodiment and the function of the threshold memory pad 122 for memorizing the threshold value 220 read from the print data that is described in the second embodiment are stored in a medium registering part 281 and a threshold memory part 282 in advance by a control part 21 of a PC 20-3. Moreover, the printer driver (print control program) controls a print operation when an application program sends an order to print. In detail, the control part 21 of the PC 20-3 controls an analysis part 26 to execute the function of the data analysis part 161 for analyzing the print data in the second embodiment and the function of the comparing part 162 for comparing the threshold value 220 with the unit price 210 of the medium in the second embodiment. The analysis part 26 includes the data analysis part 261 and the comparing part 262 for comparing the threshold value 220 with the unit price 210 of the medium. In the present embodiment, the preview data is displayed on the display part 152. Moreover, this is not limited only to the present embodiment, the preview data, for example, can be transmitted to the PC 20-3 from the transmission part 1a. In this case, the PC 20-3 receives the transmission data at the sending/receiving part 25 and the preview of the print result is displayed on the displaying pad 24.

With the configurations, the workability or operability of the control part 11 and the memory part 12 of the printer 10-3 becomes enhanced. Accordingly, the control of the print functions becomes easy, and the print speed can be improved by executing these functions.

Fourth Embodiment

The fourth embodiment is explained referring to FIGS. 9 through 12.

Figure 9:
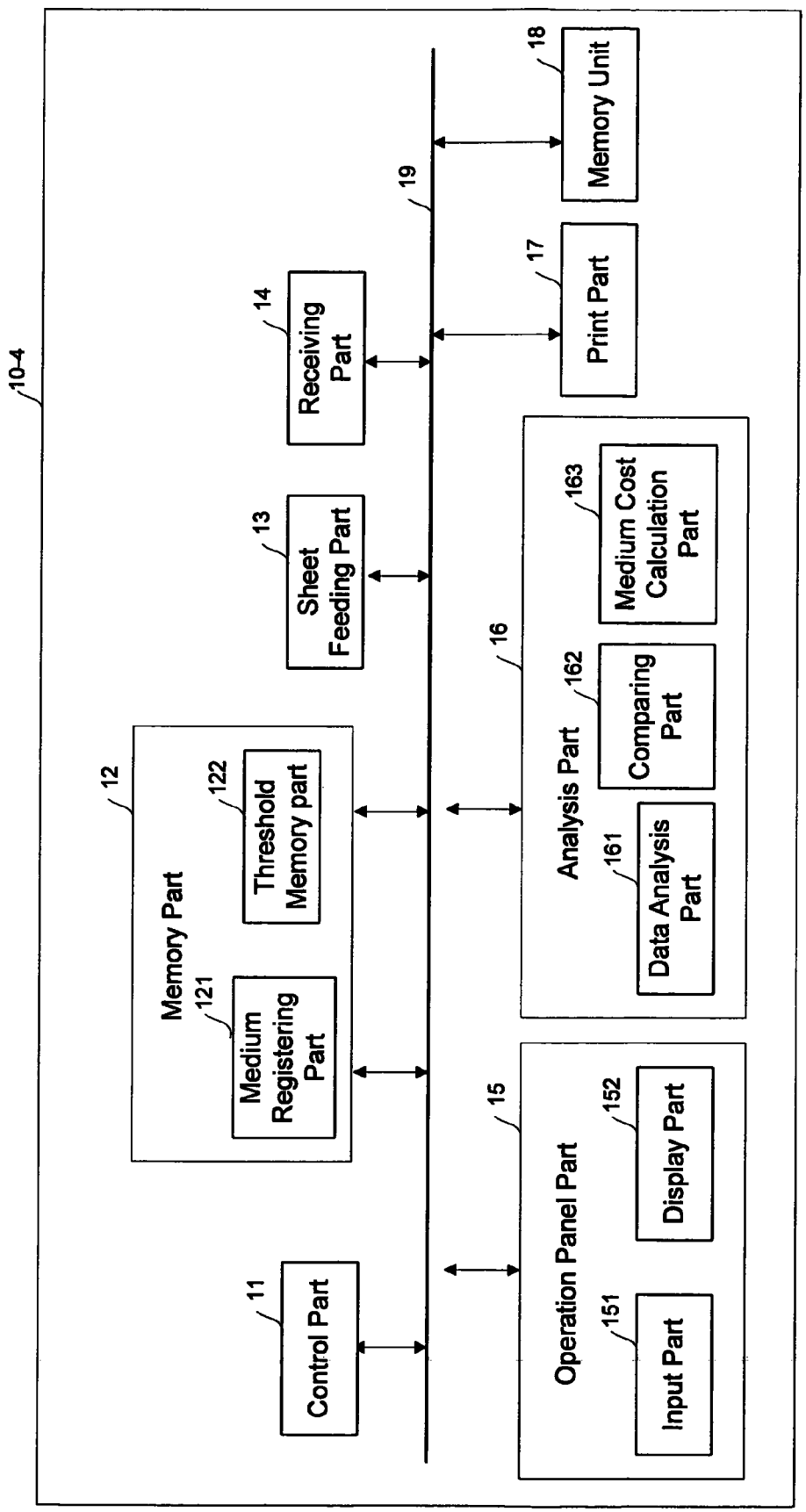
FIG. 9 is a block diagram illustrating a structure of a printer as a print device in a fourth embodiment.

FIG. 9 is the block diagram illustrating a printer 10-4 according to the fourth embodiment. The fourth embodiment is similar to the first embodiment, except that a printer 10-4 in the fourth embodiment has a medium cost calculation part 163 (or calculation part). In other words, the first embodiment describes that the printer 10-1 determines the medium type 200 from the print data 40, and displays the preview of the print result based on the unit price 210 of the medium and the threshold value 220. In contrast, the fourth embodiment describes that the printer 10-4 determines from the print data 40 the medium type 200, the number of pages, and the number of copies. Further, the printer 10-4 determines the medium cost by multiplying the unit price 210 of the medium, the number of pages and the number of copies, and displays the preview of the print result based on the medium cost and the threshold value 220. Herein, the number of pages and the number of copies are defined as part of "volume of print."

Accordingly, as shown in FIG. 9, the analysis part 16 is configured with the medium cost calculation part 163, which determines the medium cost of the print operation from the unit price 210 of the medium, the number of pages, and the number of copies, in addition to with the data analysis part 161 and the comparing part 162. As other structural elements are the same as in FIG. 1, the same numerals are applied to structure elements that are the same in FIG. 1, and their explanations are omitted.

Figure 10:
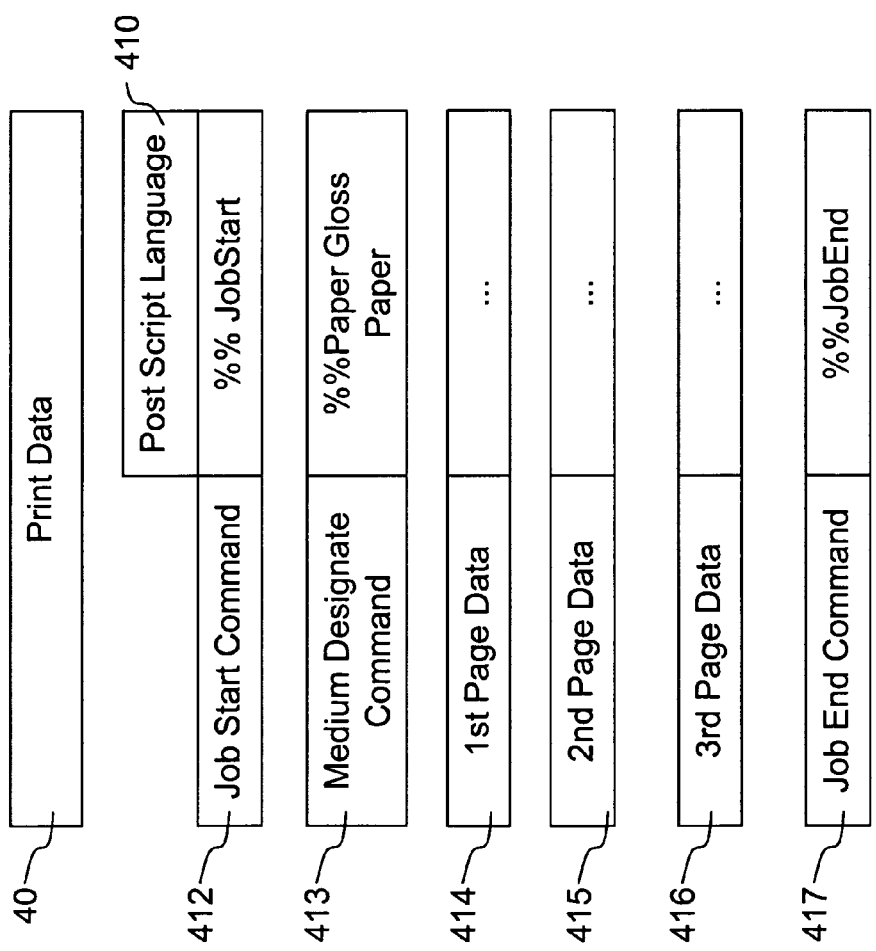
FIG. 10 is a pattern diagram illustrating the print data in the fourth embodiment.

FIG. 10 illustrates the pattern diagram of the print data 40 according to the fourth embodiment. The print data 40 includes a job start command 412 that identifies the beginning end of the print data 40, a medium designate command 413 that designates the medium type, a job end command 417 that identifies the finishing end of the print data 40 as disclosed the first embodiment. It also includes a plurality of page data described below. The page data in this embodiment has 3-page data structure including first page data 414, second page data 415 and third page data 416.

FIG. 11 is a diagram explaining a determination of a medium cost 1104 in the fourth embodiment. When gloss paper is selected to be used as the medium type, the gloss paper 204 is designated from the record of the medium type 200 and the unit price 210 in the medium registering part 121 of FIG. 2A, and the unit price 1101 of the gloss paper is determined (e.g., 50 yen). Moreover, it is assumed that the number of pages 1102 is designated 3 pages by the above page data and that the number of copies 1103 is designated one. According to the numbers, the medium cost 1104 is determined (or calculated) by multiplying the number of copies 1103 and the number of pages 1102 and the unit price 1101 of the paper used (i.e., 1×3×50 yen=150 yen).

Figure 12:
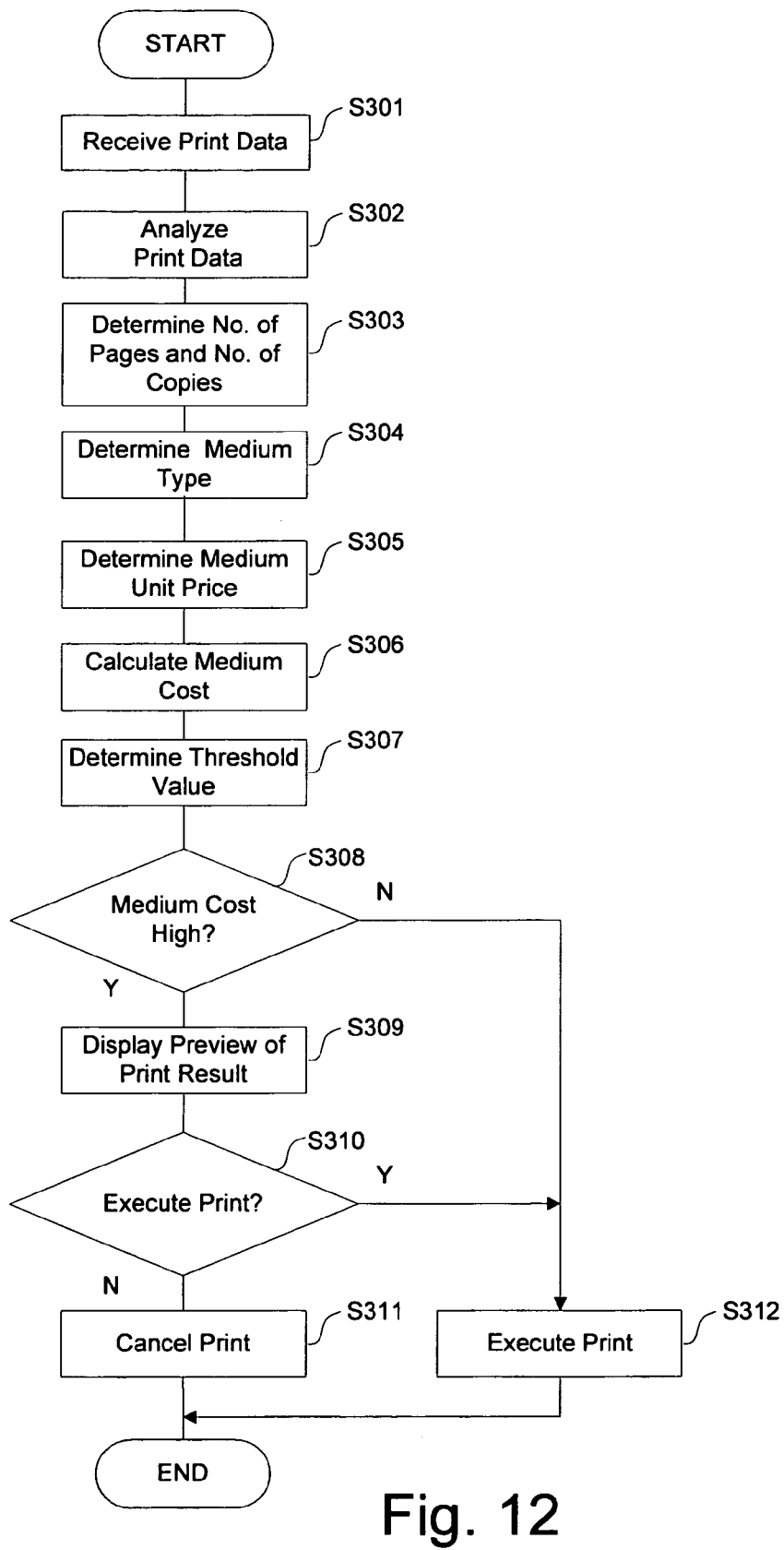
FIG. 12 is a flow diagram illustrating an operation in the fourth embodiment.

FIG. 12 is the flow diagram illustrating the operation of the printer 10-4 in the fourth embodiment. The fourth embodiment is similar to the first embodiment. However, the following steps are added in addition to the flow chart in the first embodiment: i) determining the number of pages 1102 and the number of copies 1103 for the print operation from the print data 40 (S303); and ii) calculating (or determining) the medium cost 1104 by multiplying the number of pages 1102, the number of copies 1103 and the unit price 1101 of the medium for printing. Other processing flows are comparable to those disclosed with respect to FIG. 6. Accordingly, when the medium cost 1104 is higher than a predetermined threshold value, the preview is surely displayed so that the user can determine whether or not to execute the print operation. In is noted that the predetermined threshold value in the embodiment is designed for the medium cost (or a total print operation cost) not for the unit price of the medium.

Referring to FIG. 12, the flow diagram illustrating the operation of the printer 10-4 is explained. Initially, the receiving part 14 receives the print data 40 (S301). Next, the data analysis part 161 analyzes the print data 40 (S302). Then, based on the analyzed result at the data analysis part 16, the number of pages 1102 and the number of copies 1103 from the print data 40 is determined (S303). Further, the medium type to be printed is determined (S304). Next, the unit price 1101 of the medium to be printed is determined from the medium registering part 121 (S305). Based on these results, the medium cost 1104 is calculated from the product of the medium unit price 210, the number of pages 1102 and the number of copies 1103 at the medium cost calculation part 163 (S306). Moreover, the threshold value 220 is determined from the threshold memory part 122 (S307).

Next, it is determined at the comparing part 162 whether or not the medium cost 1104 of the medium to be printed is higher than the threshold value 220 (S308). When the medium cost 1104 is higher than the threshold value 220 (YES), processing proceeds to S309, and when the medium cost 1104 is lower than the threshold value 220 (NO), processing proceeds to S312. At S309, the analysis part 16 creates the preview data of the print result, and displays it on the display part 152.

Next, the user determines whether or not to print based on the preview display (S310). In other words, it is judged which button, "PRINT" or "CANCEL," is pressed. Subsequently, when the print operation is executed, (i.e., when the "PRINT" button is pressed) (YES), the processing proceeds to S312 (the print operation is executed), and the processing completes. When the print operation is not executed (i.e., when the "CANCEL" button is pressed) (NO), the processing proceeds to S311 (the print operation is canceled), and the processing completes.

Fifth Embodiment

Figure 13:
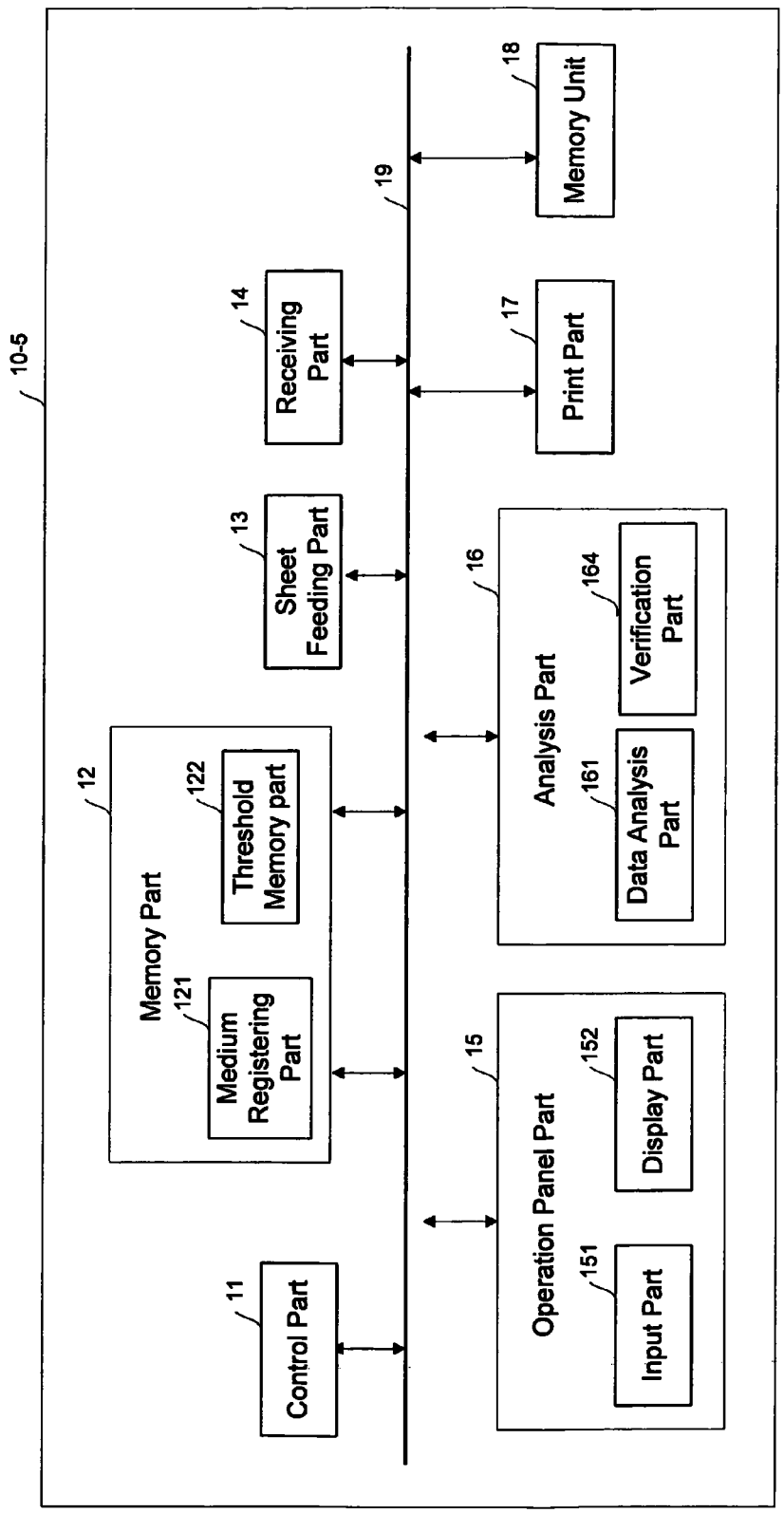
FIG. 13 is a block diagram illustrating a structure of a printer in a fifth embodiment.
Figure 14:
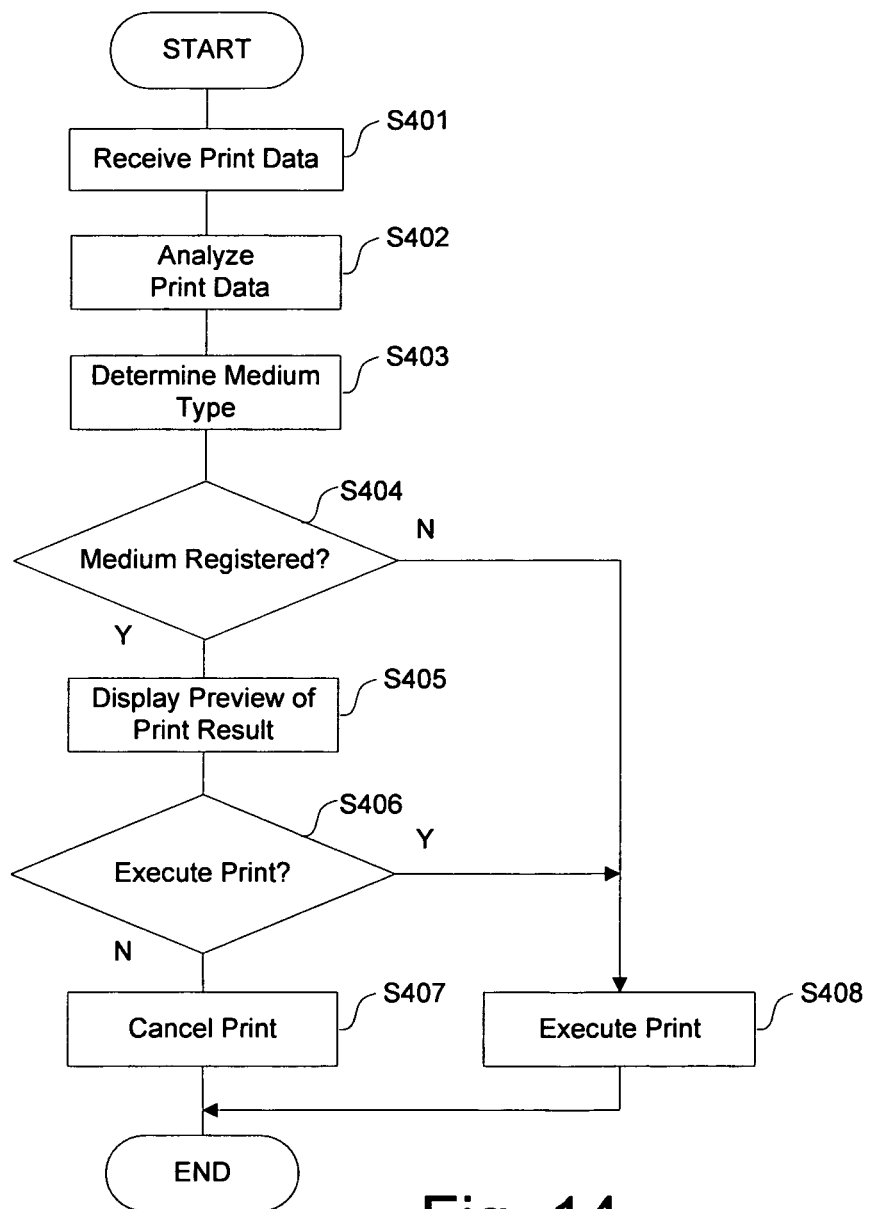
FIG. 14 is a flow diagram illustrating an operation of the printer in the fifth embodiment.

The fifth embodiment of the print device is explained referring to FIGS. 13 and 14.

FIG. 13 is a block diagram illustrating a structure of a printer 10-5 being used as a print device according to the fifth embodiment. The printer 10-5 is similar to the printer 10-1 of the first embodiment, except that the printer 10-5 includes a verification part 164 as a verification device, rather than the comparing part 162 of the analysis part 16. As other structural elements are the same as the printer 10-1 shown in FIG. 1, the same numerals are applied to the same structural elements, and their explanations are omitted.

In the present embodiment, the medium type 200 is determined from the print data 40, and is verified by the medium registering part 121 that has registered various types of media that can be used for a print operation. The preview of the print result is displayed when the determined medium 200 (or preregistered medium) has been registered in the medium registering part 121. Accordingly, the preview is always displayed when the preregistered medium is used (or selected), allowing the user to determine whether or not to execute the print operation.

FIG. 14 is a flow diagram illustrating the operation of the printer 10-5 of the fifth embodiment. The operation of the printer 10-5 is explained referring to FIG. 14. Initially, the receiving part 14 receives the print data 40 (S401). Next, the data analysis part 161 of the analysis part 16 analyzes the print data 40 (S402). Then, based on the analyzed result at the data analysis part 161, the medium type that is received from the print data 40 is determined (S403).

Next, the verification part 164 judges whether or not the medium to be printed has been registered at the medium registering part 121 (S404). When it determines that the medium to be printed has been registered (YES), processing proceeds to S405. When it determines that the medium to be printed has not been registered (NO), processing proceeds to S408. At S405, the analysis part 16 creates the preview data of the print result, and displays the preview data (or briefly the preview) on the display part 152.

Subsequently, the user determines whether or not to print based on the displayed preview data (S406). In other words, it is judged whether the "PRINT" button or the "CANCEL" button is pressed. Subsequently, when the print operation is executed, (i.e., when the "PRINT" button is pressed) (YES), processing proceeds to S408. When the print operation is not executed (i.e., when the "CANCEL" button is pressed) (NO), processing proceeds to S407, and the print operation is canceled, and processing completes. Moreover, when processing proceeds to S408, the print operation is executed and processing completes.

Sixth Embodiment

Figure 15:
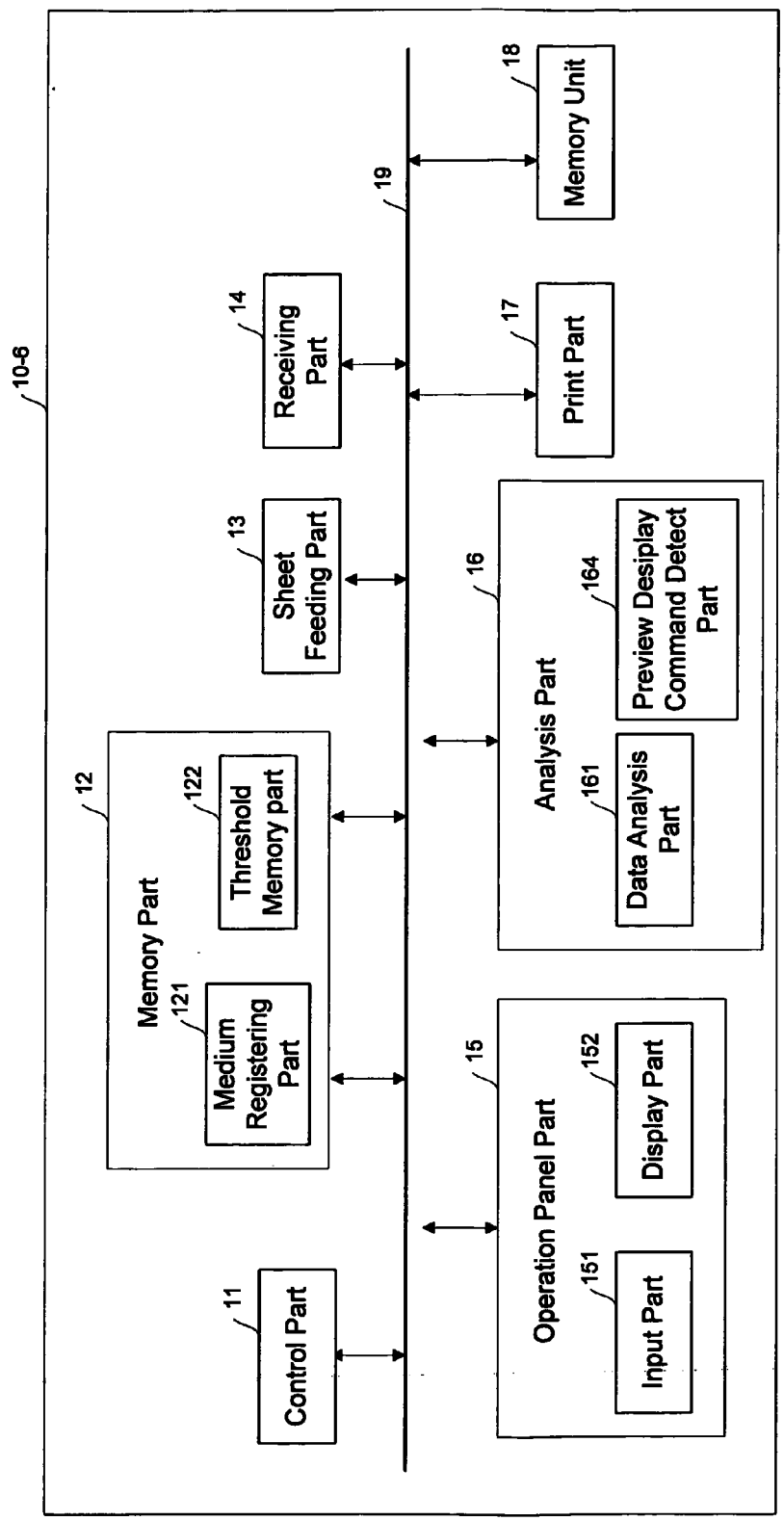
FIG. 15 is a block diagram illustrating a structure of a printer in a sixth embodiment.
Figure 16:
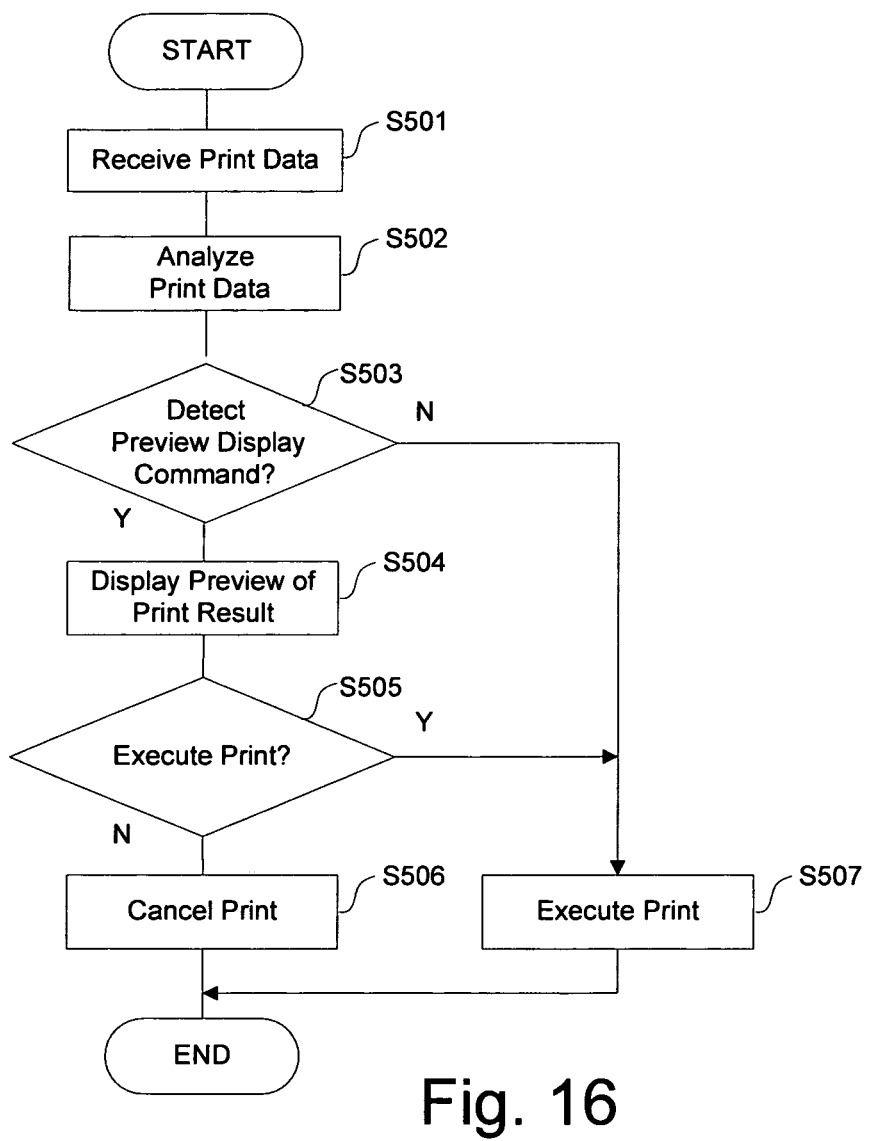
FIG. 16 is a flow diagram illustrating an operation of the printer in the sixth embodiment.

The sixth embodiment of the print device is explained referring to FIGS. 15 and 16.

FIG. 15 is a block diagram showing a structure using a printer 10-6 as the a print device, and shows the structure of the printer 10-6. The printer 10-6 is similar to the printer 10-1 of the first embodiment, except that the printer 10-6 includes a preview display command detect part 165 as a preview display command detect device rather than the comparing part 162 of the analysis part 16. As other structural elements are same as FIG. 1, and the same numerals are applied to the same structural elements, and their explanations are omitted.

In the sixth embodiment, the preview display command detect part 165 detects a preview display command that is included in the print data 40. When the command is detected, the preview of the print result is displayed on the display part 152.

FIG. 16 is a flow diagram showing the operation of the printer 10-6 of the sixth embodiment. The operation of the printer 10-6 is explained referring to FIG. 16. Initially, the receiving part 14 receives the print data 40 (S501). Next, the data analysis part 161 analyzes the print data 40 (S502).

Next, based on the analyzed result at the data analysis part 161, the preview display command detect part 165 judges whether or not the preview display command is detected (S503). When the preview display command is detected (YES), processing proceeds to S504. When the preview display command is not detected (NO), processing proceeds to S507. At S504, the analysis part 16 creates the preview data of the print result, and displays the data on the display part 152.

Next, the user determines whether or not to print the print data based on the preview display (S505). In other words, it is judged whether the "PRINT" button or the "CANCEL" button is pressed. Subsequently, when the print operation is executed, (i.e., when the "PRINT" button is pressed) (YES), processing proceeds to S507, the print operation is executed and processing completes. When the print operation is not executed (i.e., when the "CANCEL" button is pressed) (NO), processing proceeds to S506, the print operation is canceled, and processing completes.

Example of Modifications

Various embodiments of the present invention are described above. However, the present invention is not limited to these embodiments and there are many possible modifications.

For example, the fourth embodiment describes how the decision of whether or not to display a preview is made by comparing the medium cost and the threshold value. However, it is possible to determine whether or not to display a preview by comparing a total medium cost that is a product of the number of pages and the number of copies with a threshold value. In this case, an alarm message can be displayed when a large amount of paper (e.g., a print job that has a large number of total pages) is expected to be used. In this way the erroneous printing can be prevented.

Moreover, in the second embodiment, the transmission destination of the preview data is not limited to the PC 20, but also can be other machinery that includes an arithmetic processing unit, a display device or a communication device. A wide range of system development is possible.

What is claimed is:

1. A print device comprising:
   a receiving part configured to receive print data including a preview command from outside of the receiving part;
   a print part configured to print an image of the print data on a medium;
   an analysis part configured
      to analyze the print data to determine whether or not the print data includes a preview display command,
      to create preview data of a print result of the image to be printed when the preview display command is detected based on the analysis of the print data, and
      to send the print data to the print part without creating the preview data when the preview display command is not detected based on the analysis of the print data; and
   a display part configured to display the preview data without receiving user instructions when the preview data is created.

2. The print device of claim 1, wherein
   the analysis part is configured to create the preview data only when the preview display command is detected.

3. The print device of claim 1, wherein
   the preview data is formed from the print data that is actually used by the print part to print the image of print data.

4. The print device of claim 1, wherein
   the analysis part creates the preview data of the print result of the image to be printed when the preview display command is detected in the print data received by the receiving part based on the analysis of the print data, and
   the analysis part sends the print data to the print part without creating the preview data when the preview display command is not detected in the print data received by the receiving part based on the analysis of the print data.

* * * * *